May 3, 1938.  K. WEIHMANN  2,115,895
POWER TRANSMITTING DEVICE
Filed May 14, 1934   3 Sheets-Sheet 1
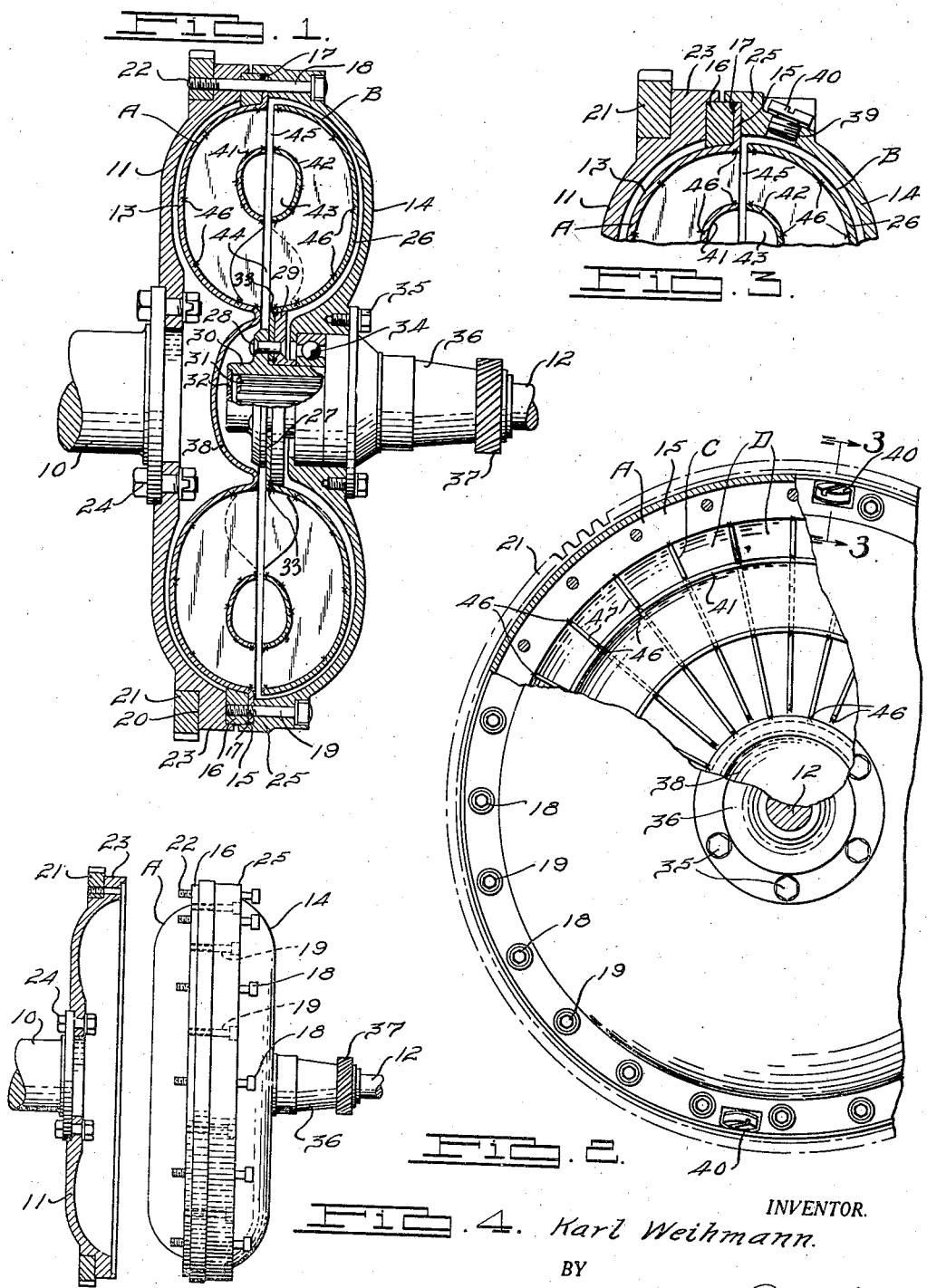
INVENTOR.
Karl Weihmann.
BY
Harness, Lind, Patee, & Harris
ATTORNEYS.

May 3, 1938. K. WEIHMANN 2,115,895
POWER TRANSMITTING DEVICE
Filed May 14, 1934 3 Sheets-Sheet 2

INVENTOR.
Karl Weihmann.
BY
Harness, Lind, Patee, & Harris.
ATTORNEYS.

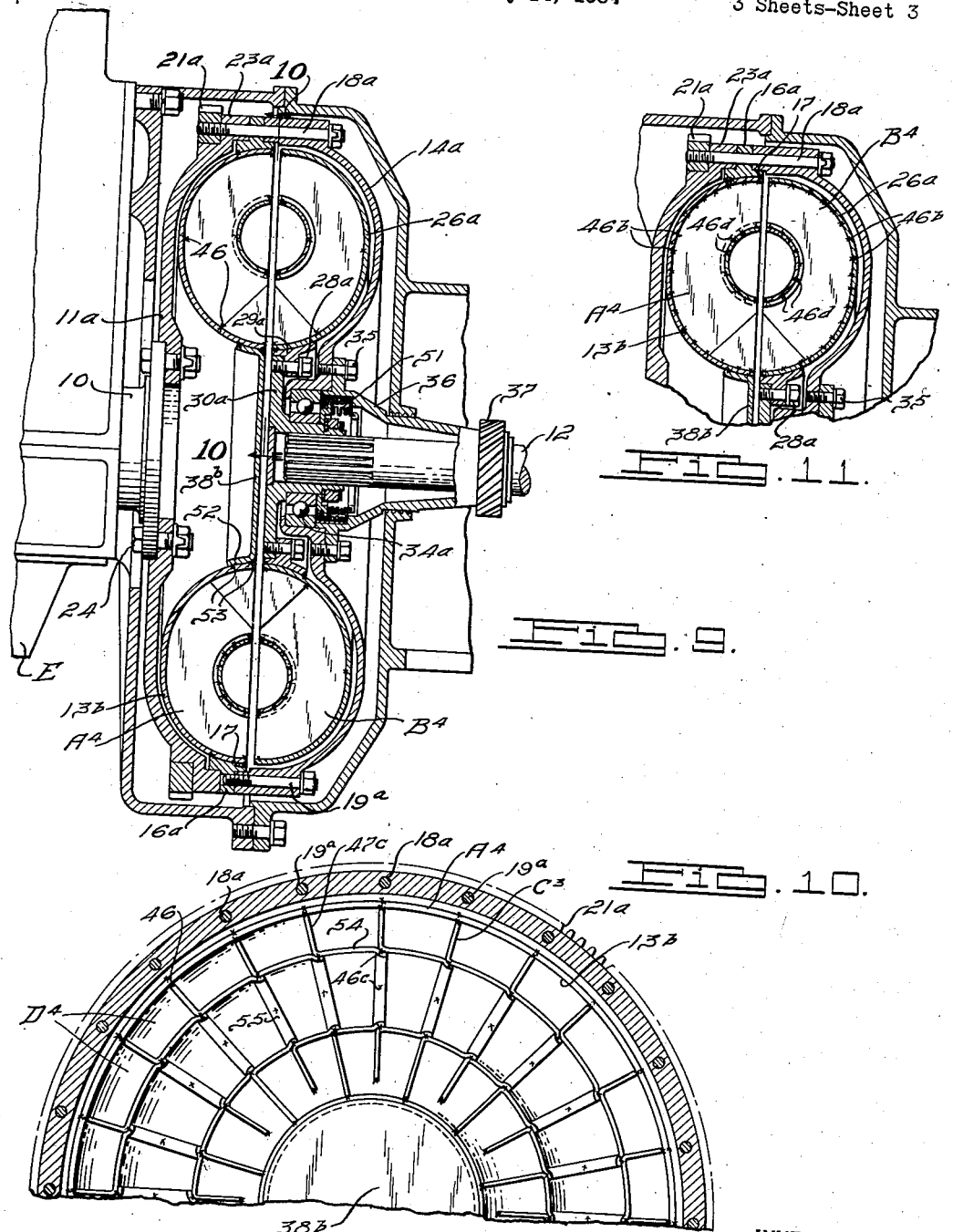

Patented May 3, 1938

2,115,895

UNITED STATES PATENT OFFICE 2,115,895

POWER TRANSMITTING DEVICE

Karl Weihmann, Detroit, Mich., assignor to Chrysler Corporation, Detroit, Mich., a corporation of Delaware Application May 14, 1934, Serial No. 725,571

9 Claims. (Cl. 103—115)

This invention relates to power transmitting devices and refers more particularly to fluid couplings, clutches, drives and the like.

It is an object of my invention to provide an improved fluid coupling capable of manufacture at relatively low cost; to provide a coupling of improved performance and efficiency; and to provide improved and more efficient characteristics of the fluid flow within the coupling.

A further object of my invention is to provide a fluid coupling of relatively light weight and low manufacturing cost without sacrificing the desired requisite strength and resistance to objectionable distortion.

In carrying out the foregoing objects of my invention, I have provided a novel coupling structure principally fabricated from sheet metal stampings, the stamped parts being secured in the assembly against displacement by the circulating fluid medium. A relatively small number of metal stampings are employed in my construction to form the vanes and the vane cover structures, these stampings being fashioned and assembled in a novel manner for attaining the objects set forth above.

A further object of my invention is to provide improved means for assembling the component parts of the fluid coupling; also improved means for assembling the fluid coupling with the driving means therefor.

A still further object of my invention is to provide a novel fluid coupling construction wherein the manufacture and assembly of the structural parts thereof is greatly facilitated.

Another object of my invention resides in the provision of a fluid coupling having an impeller structure and a runner structure adapted for assembly as a unitary construction removably secured as a unit to the flywheel or other driving means. In connection with this phase of my invention, I have also provided in the aforesaid unitary assembly, a driven shaft on which the runner structure is mounted for driving connection and also a sealing means between the shaft and the casing of the runner and impeller structures. In the more limited aspects of my invention, I have also provided a starter ring gear adapted for connection with the driving flywheel preferably by the same means which secures the aforesaid unitary assembly to the flywheel.

Further objects and advantages of my invention will be apparent from the following detailed illustrative embodiments of the principles of my invention, reference being had to the accompanying drawings in which:

Fig. 1 is a sectional elevational view axially through my improved coupling.

Fig. 2 is an end elevational view of the fluid coupling illustrated in Fig. 1, a portion of the driving casing and runner being broken away to illustrate the typical fluid passage forming members of the impeller.

Fig. 3 is a detail fragmentary sectional view along the line 3—3 of Fig. 2.

Fig. 4 is a view illustrating the assembly of the impeller and runner unit with the driving flywheel, the flywheel being shown in cross section and the runner and impeller unitary assembly being illustrated in elevation.

Fig. 9 is a sectional elevational view generally similar to Fig. 1 but illustrating a further modified embodiment of my invention.

Fig. 10 is a sectional elevational view of the impeller illustrated in the Fig. 9 embodiment, the section being taken along the line 10—10 of Fig. 9.

Fig. 11 is a fragmentary sectional elevational view of the fluid coupling illustrated in Fig. 9 but showing a modified form of welding for the structural parts thereof.

Figure 5:
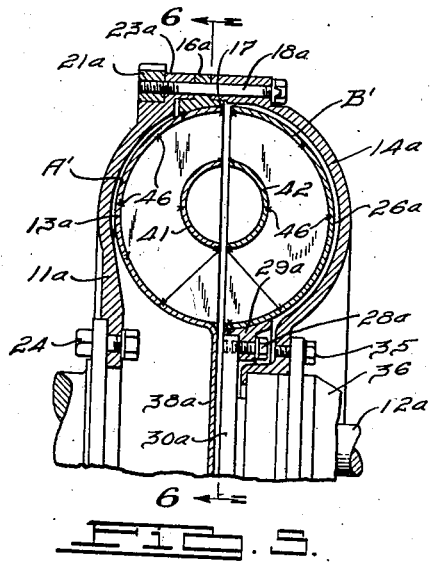
Fig. 5 is a sectional elevational view illustrating a modified form of my fluid coupling.

In the drawings and referring particularly to Figs. 1 to 4, reference character A represents the impeller structure of the fluid coupling and B designates the runner structure, the coupling being shown for illustrative purposes transmitting the drive from an angine crankshaft 10 and flywheel 11 carried thereby to a driven shaft 12 which may be connected to the driving wheels (not shown) of a motor vehicle in the well-known manner. My coupling may, of course, be employed to provide a driving connection between the various parts of different machines or devices and is not limited in its useful application to motor vehicle drives.

The impeller or rotor A has a stamped sheet metal annular vane carrying outer cover plate 13 dished as illustrated in Fig. 1 and extending around the axis of the fluid coupling assembly provided by the aligned axes of crankshaft 10 and driven shaft 12. As will be more apparent presently, the outer cover plate 13 cooperates with an annular housing member 14 to house the impeller and runner structures together with the fluid medium circulated therein, the outer cover plate 13 forming the forward casing of the coupling and the casing member 14 providing the rear casing.

The outer cover plate 13 is provided with an outwardly bent peripheral flange 15 to which the outer annular carrier ring or stiffening ring 16 is secured preferably by welding as indicated at 17. The ring 16 also has contact with the outer face of the cover plate 13 adjacent the flange 15 but the welding is preferably limited to those portions of the ring 16 which engage the flange 15 to avoid any tendency of distorting the outer end portions of the cover plate 13. The flange 15 and ring 16 are provided with a circumferentially extending series of holes therethrough, the holes in the flange and ring being aligned, alternate holes in the circumferential series being adapted to respectively receive the fastening means herein illustrated as the bolts 18 and 19 respectively.

The flywheel 11 is provided with an outer circumferentially extending shoulder 20 for receiving the ring gear 21 which is provided with a circumferentially extending series of openings each of which is adapted on assembly, as will be presently more apparent, to receive the aforesaid bolts 18, the latter having threads 22 for engagement with the openings in ring 21. It will be apparent that the starter ring gear 21 is thereby separately formed from the flywheel 11, such construction permitting the flywheel to be formed of a stamping or a casting from relatively low cost material lending itself readily to the stamping or casting operation as the case may be, the starter ring 21 being formed of a harder, higher grade steel. The flywheel 11 has an outwardly extending annular flange 23 having face contact with the starter ring 21 forwardly of the flange and being engaged by the aforesaid ring 16 rearwardly of the flywheel flange. The flywheel 11 is preferably formed separately from the engine crankshaft 10 and may be connected thereto by suitable fasteners indicated at 24.

The rear casing member 14 has an outer annular flange 25 engageable with the flange 15, the flange 25 being provided with a circumferentially extending series of spaced holes or openings adapted to align with the holes of the flange 15 and ring 16 whereby alternate holes are engaged by the respective bolts 18 and 19.

The runner rotor B is provided with the stamped sheet metal annular outer cover plate 26 dished oppositely to the cover plate 13. This cover plate 26 extends inwardly to provide the annular flange 27 connected by fasteners such as rivets 28 to and between the inner carrier ring 29 and the hub 30 splined on the forward end of the driven shaft 12 as indicated at 31. The forwardly opening end of the hub 30 adjacent the forward end of shaft 12 is closed by a closure disc 32 to prevent the escape of the fluid medium rearwardly of the driven shaft 12. The inner carrier ring 29 is secured to the flange 27, if desired, in addition to the rivets 28 by welding as indicated at 33.

The driving casing member 14 is centered on the hub 30 and driven shaft 12 by one or more ball bearing assemblies, one of which is indicated at 34 intermediate the hub 30 and casing 14 and, if desired, the casing may be connected by fasteners 35 to a sleeve 36 carrying a gear 37 for establishing a drive for an auxiliary mechanism (not shown) it being apparent that such drive takes place from crankshaft 10 through the flywheel 11 and casing member 14 independently of the rotation of driven shaft 12.

The outer cover plate 13 in my Fig. 1 embodiment has an integral central plate 38 return bent at the engagement with the cover plate 13 for strengthening purposes, the plate 38 cooperating with the cover plate 13 to provide the forward casing or housing for the fluid medium in the coupling. The plate 38 preferably extends closely adjacent the forward end of hub 30 and the splined forward end 31 of the driven shaft 12.

Before describing the details of the fluid passage forming means in the impeller A and runner B, I will describe that feature of my invention which relates to the assembly of the impeller and runner preferably together with the rear casing 14 as a unitary construction capable of assembly and disassembly with respect to the flywheel 11. This unitary assembly or subassembly preferably also includes the driven shaft 12 and auxiliary driving sleeve 36 where this sleeve is desired. Fig. 4 best illustrates the assembly unit, this figure showing the parts of the subassembly connected together by the aforesaid bolts 19. In Fig. 4 the unitary assembly is shown ready for connection to the flywheel 11 and ring gear 21, it being readily apparent that the alternating bolts 18 are adapted to engage the aligned openings of the flywheel and ring gear to securely connect the subassembly as a unit with the flywheel 11. At the time of this connection it will also be apparent that the starter gear 21 will be secured in the assembly. By reason of my construction it is possible to completely assemble the impeller and runner together with the associated parts of the fluid coupling and since the subassembly also preferably includes the driven shaft 12 and the usual fluid sealing means for preventing escape of the fluid medium from the fluid coupling, the fluid coupling may be filled or partially filled with the fluid medium prior to assembly with the driving means or flywheel 11. Likewise the subassembly may be removed for inspection or repair, the parts of the fluid coupling being removably held together as a unit by the bolts 19 when the bolts 18 are disconnected from the flywheel. The fluid medium may be oil, water, or other suitable fluid as may be desired, and the fluid medium may be introduced to the working chambers of the coupling through one or more openings 39 in the casing member 14 as best seen in Fig. 3, these openings being then closed by screw plugs 40.

The impeller A is provided with the stamped sheet metal inner cover plate 41 spaced within the outer cover plate 13 and correspondingly dished, this inner cover plate extending ring-like about the axis of shaft 12 and being substantially semi-circular in cross section. The runner B is also provided with a similar inner cover plate 42 spaced within the outer cover plate 26, these inner cover plates 41 and 42 together providing a vortex chamber 43 for the fluid which circulates between the impeller and runner around the vortex chamber as will be presently more apparent.

The rotors A and B may have vane fluid passage forming structures of generally similar construction, the typical structure being best illustrated in Figs. 1 and 2 in connection with the impeller A. Intermediate the inner and outer cover members 13 and 41 respectively are located a se- ...es of circumferentially spaced stamped sheet metal members C which are substantially arcuate in form as seen in Fig. 1 and which extend substantially radially from the low pressure chamber or zone 44 to the high pressure chamber or zone 45, these chambers being provided by circumferential clearance spaces between the oppositely facing portions of the impeller A and runner B.

In the embodiment of my invention illustrated in Figs. 1, 2 and 3, the members C are preferably stamped flat so that their inner and outer peripheral edges are respectively conformed to the inner and outer cover plates 41 and 13 for edge contact therewith, these edges being secured to the associated cover plates by welding. The welding may be readily accomplished for each rotor in suitable fixtures (not shown), it being apparent that all of the vane forming members C for each rotor may be welded simultaneously either continuously along the contacting edges of the vanes and cover plates or else at spaced intervals as indicated by the welds 46.

For convenience of reference and for comparison with other embodiments of my invention hereinafter more fully described, the radially extending vane portions of the members C may be designated by reference character 47. The circumferential spacing of the vane forming members C provide circumferentially spaced, fluid conducting passages D, these passages in the impeller A and runner B being open at their inner ends with the chamber 44 and at their outer ends with the chamber 45.

After the impeller A and runner B are formed with their respectively associated inner and outer cover plates and the vane forming members, the rotors are assembled together with the parts associated therewith to provide the aforesaid unitary assembly ready for attachment to the driving flywheel 11. When assembled with the flywheel, the impeller A will rotate with the flywheel and driving shaft 10 to cause the fluid to circulate under the action of centrifugal force from space 44 outwardly through the impeller vane passages for discharge at the space 45 where the fluid enters the runner vane passages for discharge at the space 44. The runner is thus driven from the impeller and the drive transmitted from the runner to the driven shaft 12, the slip between the rotors rapidly diminishing as the speed of the impeller increases according to the well-known properties of fluid couplings. It will be observed that the fluid space between the casing member 14 and the forward enclosure defined by the outer cover plate 13 and the central plate 38 is substantially free from projections, screws, bolts, etc., which produce noises and friction losses as the fluid is rapidly circulated within the coupling. Furthermore, it will be noted that the bounding faces of the fluid passages D will likewise provide for smooth flow of the fluid with resulting relatively high efficiency of power transmission, such smooth flow being of particular benefit in providing a high degree of slip between the rotors at low speed where slippage is desirable.

Figure 6:
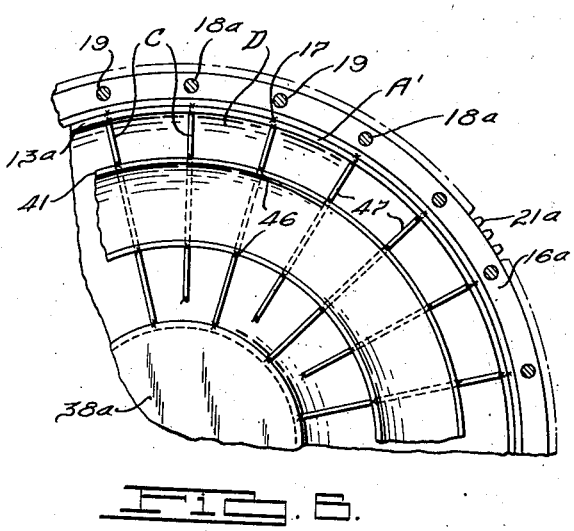
Fig. 6 is a fragmentary sectional elevational view of the fluid coupling illustrated in Fig. 5, the section being taken along the line 6—6 of Fig. 5.

Referring now to the slightly modified construction of my invention illustrated in Figs. 5 and 6, it will be noted that I have designated several of the parts therein by the same reference characters referred to hereinbefore inasmuch as such parts are of generally similar construction and of similar purpose and function. In Fig. 5 the impeller A' is provided with the outer cover plate 13$^a$ generally similar to the aforesaid cover plate 13, the cover plate 13$^a$ having the central integral stamped portion 38$^a$ in this instance lying substantially in a plane transverse to the axis of the driven shaft 12$^a$ for further minimizing friction losses of the fluid circulated in the fluid coupling. The cover plate 13$^a$ has welded thereto the outer carrier ring 16$^a$ engaged by the flange 23$^a$ of the flywheel 11$^a$, the starter ring gear 21$^a$ being associated with the flywheel as before. In Fig. 5 I have illustrated one of the through bolts 18$^a$ adapted to connect the corresponding subassembly with the flywheel 11$^a$. The outer casing member 14$^a$ is connected as before with the auxiliary driving sleeve 36.

The impeller A' and runner B' may be provided with the aforesaid inner cover plates 41 and 42 respectively, the runner B' having the outer cover plate 26$^a$ illustrated in Fig. 5 as having the welded inner carrier ring 29$^a$ secured by fasteners 28$^a$ to the hub 30$^a$ for driving connection with the driven shaft 12$^a$ as will be readily understood.

In Fig. 6 the typical impeller A' is illustrated, the fluid conducting passages D being formed by the same welded vane forming members C as were illustrated and described in connection with the Fig. 1 embodiment of my invention.

Figure 7:
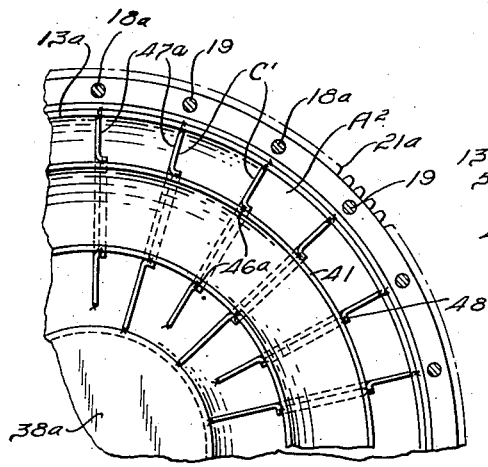
Fig. 7 is a view corresponding to Fig. 6 but illustrating a further modified form of one of the fluid coupling rotors.

In Fig. 7 I have illustrated a modified form of vane forming members C' for the typical rotor A$^2$, the rotor being otherwise similar in construction with the rotor illustrated in Fig. 1 as indicated by the use of similar reference numerals.

The members C' have radially extending arcuate vane portions 47$^a$ welded along their outer arcuate ends to the outer cover plate 13 of the impeller A$^2$, each vane portion 47$^a$ being formed with an inner circumferentially bent web or flange 48 shaped to conform to and engage the inner surface of the inner cover plate 41 and being welded thereto as indicated at 46$^a$. These webs 48 serve to further strengthen the vane forming members C' and also the structural assembly of the impeller rotor A$^2$.

Figure 8:
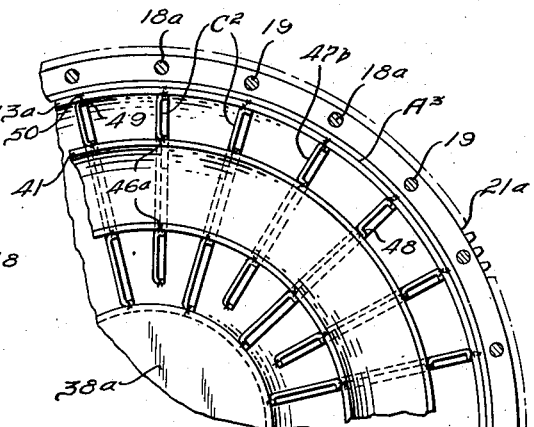
Fig. 8 is a view corresponding to Fig. 6 and illustrating a further modified form of my fluid coupling rotor.

Referring now to the further embodiment of my invention illustrated in Fig. 8, it will be noted that the typical impeller rotor A$^3$ illustrated therein generally corresponds to the rotor A$^2$ illustrated in Fig. 7 with the exception that the vane forming members C$^2$ are provided with outer arcuate webs or flanges 49 welded at 50 along the engaged inner surfaces of the outer cover plate 13. The structure otherwise is similar to that illustrated in Fig. 7, the members C$^2$ having radially extending arcuate vane portions 47$b$. It will thus be apparent that the members C$^2$ each provide an arcuate vane forming member channel-shaped in cross section for added strength, rigidity of the structure, and to further facilitate welding in certain instances.

Referring now to the further modified embodiment of my invention illustrated in Figs. 9 to 11, a portion of the engine E is illustrated therein associated with the rearwardly extending crankshaft 10 as aforesaid, the crankshaft being shown in association with parts identical with the fluid coupling illustrated in Figs. 5 and 6, namely the starter ring 21$^a$, flywheel flange 23$^a$, carrier ring 16$^a$, casing member 14$^a$ and parts associated therewith, and the through bolts 18$^a$. At the lower half of the view seen in Fig. 9, I have illustrated one of the subassembly bolts 19$^a$ corresponding in function to the bolt 19 of Fig. 1 aforesaid for permitting the building up of the fluid coupling proper for attachment as a unit to the flywheel 11ª.

In Fig. 9 I have illustrated a sealing means 51 which may be used throughout the several embodiments of my invention, this sealing means cooperating between the driving sleeve 36 and the hub 30ª to prevent escape of the fluid medium from the working space of the fluid coupling.

In Fig. 9 the central plate 38ᵇ is provided with an outer peripheral flange 52 for attachment to the outer cover plate 13ᵇ by welding as indicated at 53. The driving casing member 14ª is centered and supported on the hub 30ª by the bearing assembly 34ª.

In Figs. 9 to 11 the impeller A⁴ and the associated runner B⁴ may be similarly constructed with respect to their fluid passage forming means, Fig. 10 best illustrating the typical construction for the impeller rotor A⁴. The vane forming members C³ are provided with arcuate substantially radially extending vane portions 47ᶜ suitably connected as by welding either intermittently around one of the peripheral portions such as the outer peripheral portions thereof to the inner surfaces of the adjacent plate such as the outer cover plate 13ᵇ as indicated at the welds 46 in Figs. 9 and 10, or else continuously as indicated by the welds 46ᵇ in Fig. 11, the latter figure being otherwise identical with the showing in Fig. 9.

The members C³ are adapted in the present illustration to form the inner cover structure to provide the vortex chamber similar to the vortex chamber 43 of Fig. 1. To this end the members C³ have their inner portions angled to provide circumferentially extending dished portions 54 provided with inwardly offset terminal ends 55 fitting within the dished portion of the next adjacent member telescopic-like as clearly indicated in Fig. 10. In this manner I have provided passage forming members C³ preferably of stamped sheet metal, these members forming the vane portions circumferentially bounding the fluid passages D⁴ and also forming the inner cover ring as a continuous structure of interconnected or telescoped component dished portions of the members C³. On assembly of the rotor A⁴, the members C³ have their telescoped inner cover ring portions welded either intermittently as indicated at 46ᶜ in Figs. 9 and 10 or continuously as indicated at 46ᵈ in Fig. 11 by the well-known continuous flash method of welding. The telescoping of the dished portions as indicated at 55 is preferred to facilitate the welding bond and also to further strengthen the structure although, if desired, the welded parts may be brought into abutting relationship without the overlapping or telescoping arrangement.

Various modifications and changes will be readily apparent from the teachings of my invention, as set forth in the appended claims, and it is not my intention to limit my invention to the particular details of construction and operation shown and described herein for illustrative purposes.

What I claim is:

1. In a fluid coupling rotor, an annular dished cover structure, a plurality of fluid passage forming members within said cover structure and secured thereto, said members having circumferentially spaced substantially radially extending vane portions, said members having circumferentially extending portions overlapping each other.

2. In a fluid coupling rotor, an annular dished cover structure, a plurality of fluid passage forming members within said cover structure and secured thereto, said members having circumferentially spaced substantially radially extending vane portions, said members having circumferentially extending portions forming a second annular cover structure.

3. In a fluid coupling rotor, an annular dished cover structure, a plurality of fluid passage forming members within said cover structure and secured thereto, said members having circumferentially spaced substantially radially extending vane portions, said members having circumferentially extending dished portions, the dished portions of adjacent members being relatively telescoped.

4. In a fluid coupling rotor, an annular dished cover structure, a plurality of fluid passage forming members within said cover structure and secured thereto, said members having circumferentially spaced substantially radially extending vane portions, said members having circumferentially extending dished portions, the dished portions of adjacent members being relatively telescoped, said dished portions of said members forming a second annular cover structure co-axial with the first said cover structure.

5. In a fluid coupling rotor, an annular dished cover structure, a plurality of fluid passage forming members within said cover structure and secured thereto, said members having circumferentially spaced substantially radially extending vane portions, said members having circumferentially extending dished portions provided with offset ends, the offset end of each of said members fitting within the dished portion of the next adjacent member.

6. In a fluid coupling rotor, an annular dished cover structure, a plurality of fluid passage forming members within said cover structure, said members having circumferentially spaced substantially radially extending vane portions welded at one end thereof substantially perpendicularly to said cover structure, said members having their other ends angled to provide circumferentially extending dished portions forming a second annular cover structure co-axial with the first said cover structure.

7. In a fluid coupling rotor, an outer annular dished cover structure, a plurality of fluid passage forming members within said outer cover structure, said members having arcuate substantially radially extending and circumferentially spaced vane portions secured at their outer ends to said outer cover structure, said members having their inner ends angled to provide circumferentially extending dished portions forming an inner cover structure.

8. In a fluid coupling rotor, inner and outer annular dished cover structures connected by circumferentially spaced fluid passage forming vanes, said vanes having circumferentially extending portions forming one of said cover structures.

9. In a fluid coupling rotor, inner and outer annular dished cover structures connected by circumferentially spaced fluid passage forming vanes, said vanes having circumferentially extending portions successively overlapping each other to form one of said cover structures.

KARL WEIHMANN.